(12) United States Patent
Sumimoto et al.

(10) Patent No.: US 10,283,242 B2
(45) Date of Patent: May 7, 2019

(54) POLYMER BUSHING (71) Applicant: SWCC SHOWA CABLE SYSTEMS CO., LTD., Tokyo (JP)

(72) Inventors: Tsutomu Sumimoto, Kanagawa (JP); Akihisa Kuwaki, Tokyo (JP); Kazuhisa Adachi, Kanagawa (JP)

(73) Assignee: SWCC SHOWA CABLE SYSTEMS CO., LTD., Tokyo (JP)

( * ) Notice: Subject to any disclaimer, the term of this patent is extended or adjusted under 35 U.S.C. 154(b) by 86 days.

(21) Appl. No.: 15/546,060

(22) PCT Filed: Jan. 25, 2016

(86) PCT No.: PCT/JP2016/000344
§ 371 (c)(1),
(2) Date: Jul. 25, 2017

(87) PCT Pub. No.: WO2016/121360
PCT Pub. Date: Aug. 4, 2016

(65) Prior Publication Data
US 2018/0286540 A1  Oct. 4, 2018

(30) Foreign Application Priority Data

Jan. 28, 2015 (JP) .................. 2015-014363

(51) Int. Cl.
*H01B 17/26* (2006.01)
*H01B 17/00* (2006.01)
(Continued)

(52) U.S. Cl.
CPC .......... *H01B 17/303* (2013.01); *H01B 17/26* (2013.01); *H01B 17/42* (2013.01); *H02G 15/064* (2013.01); *H01B 17/525* (2013.01); *H02G 3/22* (2013.01)

(58) Field of Classification Search
CPC .. H02G 3/22; H02G 3/04; H02G 3/24; H02G 3/30; H02G 3/36; H02G 15/34;
(Continued)

(56) References Cited

U.S. PATENT DOCUMENTS

| | | | | |
|---|---|---|---|---|
| 7,964,799 B2 * | 6/2011 | Isberg | ................. | H01B 17/303 174/152 R |
| 8,003,891 B2 * | 8/2011 | Rocks | ................... | H01B 17/28 174/152 R |

(Continued)

FOREIGN PATENT DOCUMENTS

| | | |
|---|---|---|
| JP | H09-134628 A | 5/1997 |
| JP | 2002-157932 A | 5/2002 |

(Continued)

OTHER PUBLICATIONS

Extended European Search Report dated Jun. 4, 2018 for the corresponding European Patent Application No. 16742964.6.

(Continued)

*Primary Examiner* — Angel R Estrada
(74) *Attorney, Agent, or Firm* — Brundidge & Stanger, P.C.

(57) ABSTRACT

A polymer bushing includes: an inner conductor; a hard insulating tube; a shielding metal fitting; a polymer covering that includes a body part that covers an outer periphery of the insulating tube, and a plurality of umbrella-shaped sheds that are formed at an outer periphery of the body part; and an electric-field stress-control layer that is composed of a zinc oxide layer or a high-permittivity layer, and is disposed along an interface between the insulating tube and the polymer covering. A rear end part of the electric-field stress-control layer is connected to the shielding metal fitting. The body part includes a first body part that has a uniform thickness, and a second body part that is located in a region around a front end part of the electric-field stress-
(Continued)

control layer and has a thickness greater than the thickness of the first body part.

7 Claims, 5 Drawing Sheets

(51) Int. Cl.
| | |
|---|---|
| *H01B 17/30* | (2006.01) |
| *H02G 15/064* | (2006.01) |
| *H01B 17/42* | (2006.01) |
| *H01B 17/52* | (2006.01) |
| *H02G 3/22* | (2006.01) |

(58) Field of Classification Search
CPC ...... H02G 15/20; H02G 3/083; H02G 15/064; H01B 17/005; H01B 17/00; H01B 17/26; H01B 17/303; H01B 17/265; H01B 17/28; H01B 17/50; H01B 17/42; H01B 17/525
USPC .... 174/140 R, 142, 144, 650, 152 R, 11 BH, 174/14 BH, 31 R, 141 C, 73.1, 75 R; 16/2.1, 2.2
See application file for complete search history.

(56) References Cited

U.S. PATENT DOCUMENTS

| | | | | |
|---|---|---|---|---|
| 8,319,101 | B2 * | 11/2012 | Adachi | H02G 15/064 |
| | | | | 174/137 R |
| 8,637,773 | B2 * | 1/2014 | Jonsson | B29C 70/58 |
| | | | | 174/137 B |
| 8,704,097 | B2 * | 4/2014 | Xu | H01B 17/42 |
| | | | | 174/11 BH |
| 8,861,165 | B2 * | 10/2014 | Kampe | H01B 17/16 |
| | | | | 174/142 |
| 9,947,442 | B2 * | 4/2018 | Engels | H01B 17/265 |
| 2002/0076517 | A1 | 6/2002 | Yanagisawa et al. | |
| 2010/0175907 | A1 | 7/2010 | Adachi et al. | |
| 2015/0214713 | A1 | 7/2015 | Wu et al. | |

FOREIGN PATENT DOCUMENTS

| | | |
|---|---|---|
| JP | 2007-151310 A | 6/2007 |
| JP | 2007-188735 A | 7/2007 |
| JP | 2009-005514 A | 1/2009 |
| JP | 2012-075266 A | 4/2012 |
| WO | 2014/057381 A1 | 4/2014 |

OTHER PUBLICATIONS

International Search Report from International Application No. PCT/JP2016/000344 dated Mar. 1, 2016.

* cited by examiner

POLYMER BUSHING

TECHNICAL FIELD

The present invention relates to a polymer bushing. In particular, the present invention relates to a polymer bushing in which an electric-field stress-control layer is provided at an interface between an insulating tube formed of an epoxy resin or the like and a polymer covering formed of a silicone rubber or the like.

BACKGROUND ART

In recent years, from the viewpoint of achieving weight reduction, thickness reduction, and downsizing of a bushing, commonality of the bushing type, simplification of the operation process and the like, polymer bushings having a solid insulation structure (complete dry type) in which a polymer covering formed of a silicone rubber or the like is directly molded on the outer peripheral surface of an insulating tube formed of an epoxy resin or the like are practically used (for example, PTLS 1 to 4).

In a polymer bushing, corona discharge is generated at the exterior surface of the polymer bushing when the electric field strengthens. In the case where corona discharge is generated for a long period of time, the polymer covering can possibly be chemically eroded, and degraded (erosion). Normally, for the purpose of preventing corona discharge, the polymer covering includes a body part that covers the outer periphery of the insulating tube, and umbrella-shaped sheds formed with a space therebetween in the longitudinal direction on the outer periphery of the body part.

In addition, in the polymer bushing disclosed in PTL 1, an electric-field stress-control layer is disposed at the interface between an insulating tube (insulator) and a polymer covering for the purpose of further improving the corona resistance. Further, the electric-field stress-control layer includes a tapered part whose thickness increases toward the front end side while the inner diameter decreases toward the front end side, and is formed in an arc surface shape. In particular, the configuration in which the front end part of the electric-field stress-control layer where the electric field concentrates is disposed at a position adjacent to a thick part of the shed is very useful for reducing corona discharge. In the organic composite porcelain bushing (polymer bushing) disclosed in PTL 2, the outer diameter of the body part of an exterior cover (polymer covering) and an umbrella part (shed) is greater than that of other portions in a region around an upper end part (a portion where a maximum electric field is generated at the surface) of an inner electrode (inner conductor).

CITATION LIST

Patent Literature

PTL 1
Japanese Patent Application Laid-Open No. 2012-75266
PTL 2
Japanese Patent Application Laid-Open No. 2002-157932
PTL 3
Japanese Patent Application Laid-Open No. 2007-188735
PTL 4
Japanese Patent Application Laid-Open No. 2009-5514

SUMMARY OF INVENTION

Technical Problem

However, in the polymer bushing disclosed in PTL 1, the electric-field stress-control layer is provided over the long area in the axial direction from the large diameter part to the small diameter part of the polymer bushing, and consequently the material cost of the electric-field stress-control layer is high. In addition, since the electric-field stress-control layer has a complicated shape in the area from the tapered part to the front end part, a metal mold or working for the complicated shape is required in order to obtain the same outer diameter of the insulating tube and the outer diameter of the electric-field stress-control layer at the small diameter part of the polymer covering, and a cumbersome work is required in order to obtain the complicated shape of the insulator.

In addition, in the organic composite porcelain bushing disclosed in PTL 2, salt tends to be retained in at a portion where the diameter is enlarged, and consequently the pollution resisting performance of the polymer bushing may possibly be degraded.

An object of the present invention is to provide a polymer bushing which can improve the corona resistance, and can achieve a higher voltage.

Solution to Problem

A polymer bushing according to an embodiment of the present invention includes: an inner conductor that is disposed at a center and has a rod shape; a hard insulating tube that is integrally formed at an outer periphery of the inner conductor; a shielding metal fitting that is embedded to the insulating tube such that the shielding metal fitting is concentric with the inner conductor; a polymer covering that includes a body part that covers an outer periphery of the insulating tube, and a plurality of umbrella-shaped sheds that are formed with a space therebetween in a longitudinal direction at an outer periphery of the body part; and an electric-field stress-control layer that is composed of a zinc oxide layer or a high-permittivity layer, and is disposed along an interface between the insulating tube and the polymer covering. A rear end part of the electric-field stress-control layer is connected to the shielding metal fitting. The body part includes a first body part that has a uniform thickness, and a second body part that is located in a region around a front end part of the electric-field stress-control layer and has a thickness greater than the thickness of the first body part.

Advantageous Effects of Invention

According to the embodiments of the present invention, it is possible to provide a polymer bushing in which the electric field of the air surface of a polymer bushing (shed surface) in a region around the front end part of an electric-field stress-control layer where the electric field concentrates is reduced. Accordingly, the corona resistance of the polymer bushing is improved, and a higher voltage can be achieved. For example, a high voltage such as the rated voltage 154 kV can be handled.

DESCRIPTION OF EMBODIMENTS

First Embodiment

An embodiment of the present invention is described below in detail with reference to the drawings.

Figure 1:
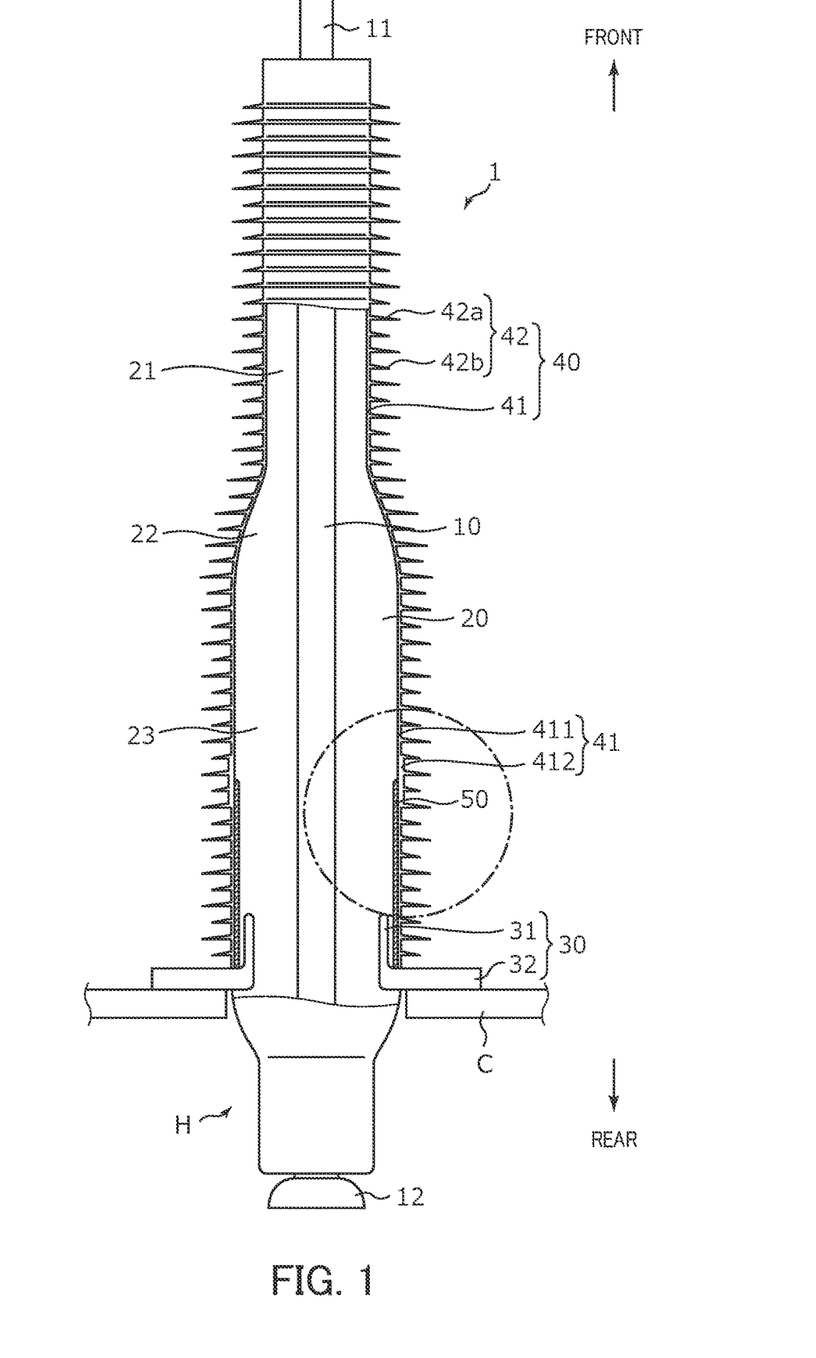
FIG. 1 is a partial sectional view illustrating a general configuration of a polymer bushing according to a first embodiment.

FIG. 1 is a partial sectional view illustrating a general configuration of a polymer bushing according to a first embodiment of the present invention. In the following description, the upper side in the drawing is the front end side, and the lower side is the rear end side. Polymer bushing 1 illustrated in FIG. 1 is a bushing for an equipment, and includes on the rear end side head part H that is disposed in a power equipment such as a transformer.

As illustrated in FIG. 1, polymer bushing 1 includes rod-shaped inner conductor 10 disposed at a center, insulating tube 20 provided at the outer periphery of inner conductor 10, shielding metal fitting 30 formed integrally with insulating tube 20, polymer covering 40 provided at the outer periphery of insulating tube 20, electric-field stress-control layer 50 disposed at the interface between insulating tube 20 and polymer covering 40, and the like.

Inner conductor 10, insulating tube 20, shielding metal fitting 30, polymer covering 40, and electric-field stress-control layer 50 are integrally formed by molding. To be more specific, in the state where inner conductor 10 and shielding metal fitting 30 are set to a metal mold, insulating tube 20 is molded. After the molding, the resulting product is set to a metal mold for molding of an electric-field stress-control layer, and electric-field stress-control layer 50 is molded on the outer peripheral surface of large diameter part 23 of insulating tube 20 as described later. Further, the resulting product with the molded electric-field stress-control layer 50 is set to a metal mold for a polymer covering, and polymer covering 40 is molded on the outer peripheral surface of electric-field stress-control layer 50 and insulating tube 20. It is to be noted that, at the time of voltage application in polymer bushing 1, inner conductor 10 is at a high potential, and shielding metal fitting 30 is at a ground potential.

Inner conductor 10 is composed of a conductive material suitable for energization composed of copper, aluminum, copper alloy or aluminum alloy and the like, for example. In polymer bushing 1, the both end parts (front end part 11 and rear end part 12) of inner conductor 10 are exposed from insulating tube 20. Front end part 11 of inner conductor 10 is connected to an overhead line, a lead-in line (not illustrated) and the like, and rear end part 12 of inner conductor 10 is connected to a high voltage conducting body in a power equipment. While rear end part 12 of inner conductor 10 has a shape with a corona shield in the embodiment of FIG. 1, rear end part 12 may have a rod-shaped as it is.

Insulating tube 20 is composed of a hard plastic resin material (such as epoxy resin and FRP (Fiber Reinforced Plastics)) having a high mechanical strength. Insulating tube 20 includes small diameter part 21 formed in a straight barrel shape on the front end side, tapered part 22 whose diameter gradually increases from small diameter part 21 toward the rear end side, and large diameter part 23 formed in a straight barrel shape on the rear end side of tapered part 22. In addition, a rear end part of insulating tube 20 (a portion provided continuously with the rear end side (the rear end side relative to flange part 32 of shielding metal fitting 30) of large diameter part 23) serves as head part H that is disposed in a power equipment.

When the diameter of the entirety of insulating tube 20 is increased, the surface potential of polymer bushing 1 can be readily reduced, but the quake resistance and the bending load resistance required for polymer bushing 1 are reduced. With insulating tube 20 having a structure including small diameter part 21, tapered part 22, and large diameter part 23, it is possible to ensure the electric performance, the aseismic quake resistance, and the bending load resistance at the same time.

Shielding metal fitting 30 includes cylinder part 31 that is embedded concentrically with inner conductor 10 in large diameter part 23 of insulating tube 20, and flange part 32 that protrudes radially outward from the rear end of cylinder part 31. Cylinder part 31 has an electric-field relaxation function, and relaxes the electric field of polymer bushing 1. By connecting by a connecting member (not illustrated) such as a bolt with flange part 32 placed on case C of a power equipment, polymer bushing 1 is air-tightly fixed to the power equipment.

Polymer covering 40 is composed of a material having an excellent electric insulation performance (for example, a polymer material such as silicone polymer). Polymer covering 40 is formed to cover a portion of the outer periphery of insulating tube 20 except for head part H (a portion on the front end side relative to flange part 32 of shielding metal fitting 30). Polymer covering 40 includes body part 41 that covers the outer periphery of the insulating tube, and a plurality of umbrella-shaped sheds 42 formed on the outer periphery of body part 41 with a space therebetween in the longitudinal direction. While a plurality of umbrella-shaped sheds 42a and 42b having different protruding lengths (long and short) are alternately formed with a space therebetween in the longitudinal direction in FIG. 1, sheds 42a and 42b may have the same protruding length.

Electric-field stress-control layer 50 is formed of a zinc oxide (ZnO) layer or a high-permittivity layer. Specifically, for example, electric-field stress-control layer 60 is composed of a zinc oxide layer made of a resin material added with zinc oxide powder, or, a high-permittivity layer made of a rubber or the like added with a conductive filler such as carbon black and having a relative permittivity of 10 or greater. Electric-field stress-control layer 50 is formed integrally with insulating tube 20 by molding on the outer peripheral surface of large diameter part 23 of insulating tube 20. That is, in polymer bushing 1, electric-field stress-control layer 50 is provided along the interface between large diameter part 23 of insulating tube 20 and polymer covering 40.

In the longitudinal direction, the length of large diameter part 23 of insulating tube 20 is greater than that of electric-field stress-control layer 50, and in the present embodiment, the length of large diameter part 23 of insulating tube 20 is about more than double the length of electric-field stress-control layer 50. That is, electric-field stress-control layer 50 is located at large diameter part 23 of insulating tube 20. Since the length of electric-field stress-control layer 50 is small in comparison with the polymer bushing disclosed in PTL 1, the material cost required for forming electric-field stress-control layer 50 can be reduced.

The rear end of electric-field stress-control layer 50 is electrically connected to shielding metal fitting 30. Electric-field stress-control layer 50 is formed on the outer peripheral surface of large diameter part 23 of insulating tube 20, and therefore has the same diameter in its entirety. By forming electric-field stress-control layer 50 at large diameter part 23, the electric field distribution is optimized, and the electric performance of polymer bushing 1 is improved.

Figure 2:
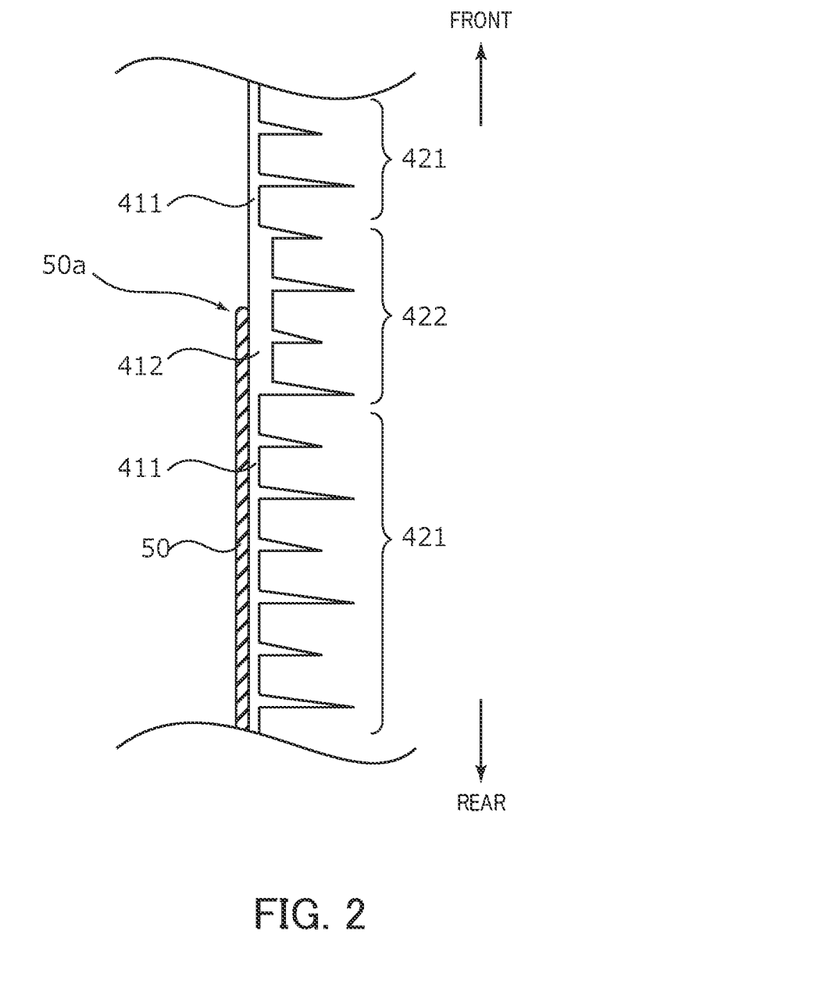
FIG. 2 illustrates a front end part of an electric-field stress-control layer of the first embodiment in an enlarged manner.

FIG. 2 illustrates the front end part (the portion enclosed with alternate long and short dash line in FIG. 1) of electric-field stress-control layer 50 in polymer bushing 1 in an enlarged manner. As illustrated in FIG. 2, in polymer bushing 1, body part 41 of polymer covering 40 is divided into thin part 411 (first body part) and thick part 412 (second body part). Thin part 411 is a portion which forms a most part of polymer covering 40 and has a uniform thickness. Thick part 412 is a portion whose thickness is greater than that of thin part 411.

Thick part 412 is located in a region around front end part 50a of electric-field stress-control layer 50. That is, at least a portion of body part 41 which is located at front end part 50a of electric-field stress-control layer 50 is thick part 412.

The outer diameter of shed 422 provided at the outer periphery of the body part of thick part 412 is identical to the outer diameter of shed 421 provided at the outer periphery of thin part 411 adjacent to thick part 412. Unlike PTL 2, the present embodiment is not designed to increase the diameter of the entire portion where the electric field is concentrated, and thus a desired pollution resisting performance can be ensured.

Further, in the first embodiment, the outer diameter of thick part 412 is greater than the outer diameter of thin part 411 adjacent to thick part 412, and the inner diameter of thick part 412 is identical to the inner diameter of thin part 411 adjacent to thick part 412. That is, a part of body part 41 of polymer covering 40 is expanded radially outward to form thick part 412. With this configuration, thick part 412 can be formed with minimum necessary design change.

Preferably, the thickness of thick part 412 is approximately two to three times the thickness of thin part 411. With this configuration, the electric field of the air surface of the polymer bushing can be effectively reduced while suppressing reduction in creepage distance.

As described above, polymer bushing 1 includes: inner conductor 10 that is disposed at a center and has a rod shape; hard insulating tube 20 that is integrally formed at an outer periphery of inner conductor 10; shielding metal fitting 30 that is embedded to insulating tube 20 such that shielding metal fitting 30 is concentric with inner conductor 10; a polymer covering 40 that includes body part 41 that covers an outer periphery of insulating tube 20, and a plurality of umbrella-shaped sheds 42 that are formed with a space therebetween in a longitudinal direction at an outer periphery of body part 41; and electric-field stress-control layer 50 that is composed of a zinc oxide layer or a high-permittivity layer, and is disposed along an interface between insulating tube 20 and the polymer covering 40. A rear end part of electric-field stress-control layer 50 is connected to shielding metal fitting 30. Body part 41 of the polymer covering 40 includes thin part 411 (first body part) that has a uniform thickness, and thick part 412 (second body part) that is located in a region around a front end part of electric-field stress-control layer 50 and has a thickness greater than the thickness of thin part 411.

The thickness of body part 41 of polymer covering 40 at at least a portion located at front end part 50a of electric-field stress-control layer 50 where the electric field tends to be concentrated is greater than that of other portions, and thus polymer bushing 1 can reduce the electric field of the air surface of the polymer bushing 1 (shed surface) in a region around front end part 50a of electric-field stress-control layer 50. Accordingly, the corona resistance is improved, and a high voltage such as the rated voltage 154 kV can be handled without increasing the diameter more than necessary. In addition, the shape of front end part 50a of electric-field stress-control layer 50 is simple in comparison with the polymer bushing disclosed in PTL 1, and therefore electric-field stress-control layer 50 can be readily formed.

It is to be noted that, in polymer bushing 1 according to the first embodiment, the creepage distance is slightly short since body part 41 is expanded radially outward to form thick part 413, and accordingly, it is preferable to increase the length of the part having sheds in air of polymer bushing 1.

Second Embodiment

Figure 3:
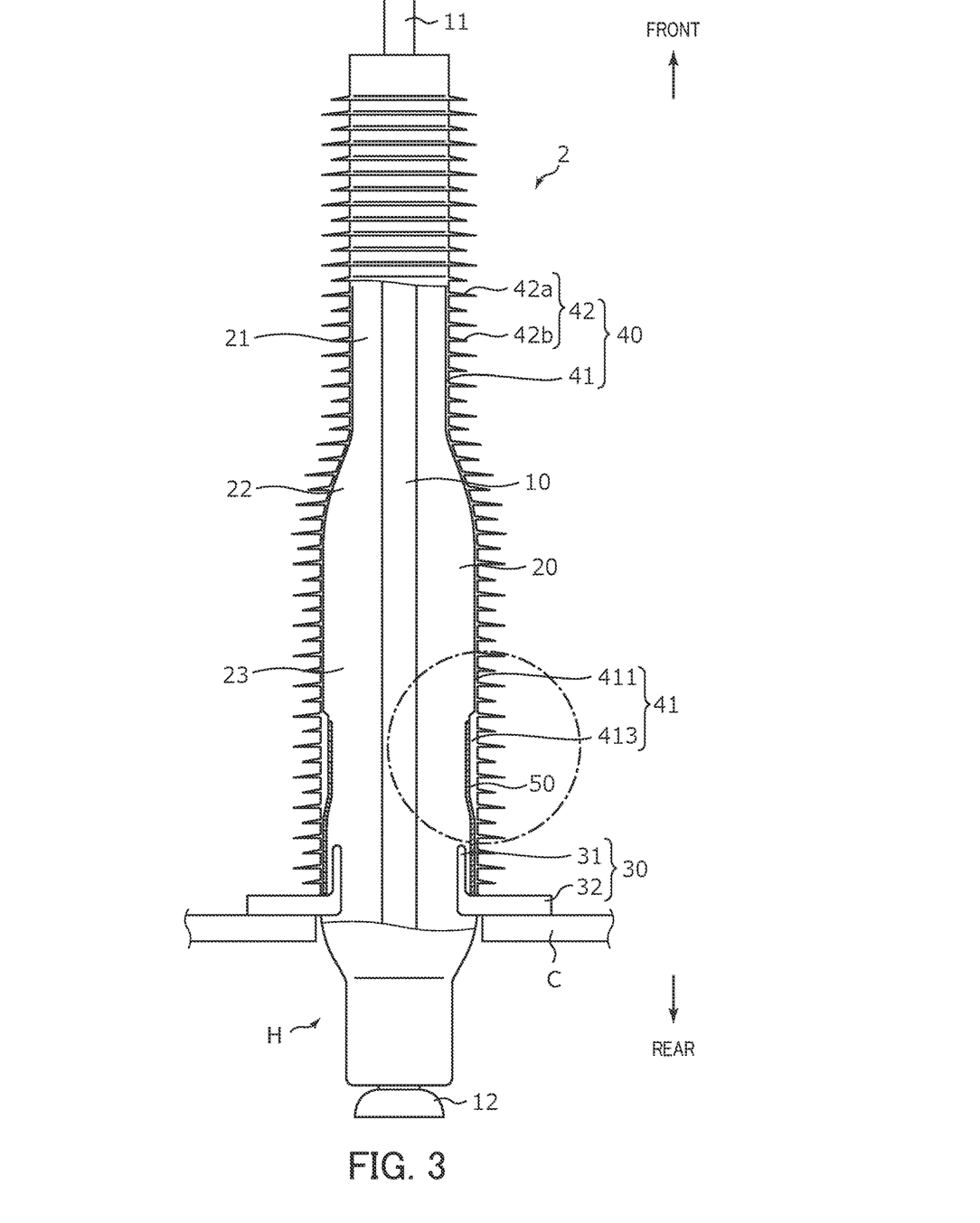
FIG. 3 is a partial sectional view illustrating a general configuration of a polymer bushing according to a second embodiment.
Figure 4:
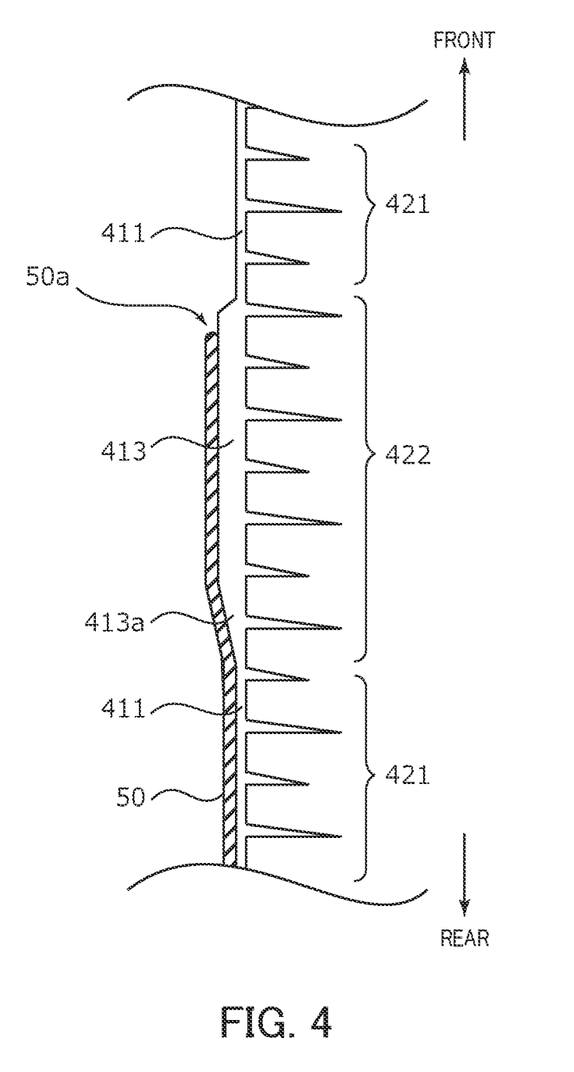
FIG. 4 illustrates a front end part of an electric-field stress-control layer of the second embodiment in an enlarged manner.

FIG. 3 is a partial sectional view illustrating a general configuration of polymer bushing 2 according to the second embodiment. FIG. 4 illustrates the front end part of electric-field stress-control layer 50 in polymer bushing 2 in an enlarged manner. Polymer bushing 2 is identical to polymer bushing 1 according to the first embodiment in basic structure, and is different from polymer bushing 1 according to the first embodiment in structure in a region around the front end part of electric-field stress-control layer 50.

As illustrated in FIG. 4, in polymer bushing 2, body part 41 of polymer covering 40 is divided into thin part 411 (first body part) and thick part 413 (second body part). Thin part 411 is a portion which forms a most part of polymer covering 40 and has a uniform thickness. Thick part 413 is a portion whose thickness is greater than that of thin part 411.

Thick part 413 is located in a region around front end part 50a of electric-field stress-control layer 50. That is, at least a portion of body part 41 which is located at front end part 50a of electric-field stress-control layer 50 is thick part 413.

The outer diameter of shed 422 provided at the outer periphery of the body part of thick part 413 is identical to the outer diameter of shed 421 provided at the outer periphery of thin part 411 adjacent to thick part 413. Unlike PTL 2, the present embodiment is not designed to increase the diameter of the entire portion where the electric field is concentrated, and thus a desired pollution resisting performance can be ensured.

Further, in the second embodiment, the outer diameter of thick part 413 is identical to the outer diameter of thin part 411 adjacent to thick part 413, and the inner diameter of thick part 413 is smaller than the inner diameter of thin part 411 adjacent to thick part 413. That is, a part of body part 41 of polymer covering 40 is expanded radially inward to form thick part 413. To be more specific, thick part 413 includes slope part 413a whose thickness gradually decreases toward adjacent thin part 411 on the rear end side. With this configuration, thick part 413 can be formed with minimum necessary design change.

Preferably, the thickness of thick part 412 is approximately two to three times the thickness of thin part 411. With this configuration, the electric field of the surface of the polymer bushing can be effectively reduced while preventing degradation of the mechanical strength and the insulating property due to reduction in thickness of insulating tube 20.

As described above, polymer bushing 2 includes: inner conductor 10 that is disposed at a center and has a rod shape; hard insulating tube 20 that is integrally formed at an outer periphery of inner conductor 10; shielding metal fitting 30 that is embedded to insulating tube 20 such that shielding metal fitting 30 is concentric with inner conductor 10; a polymer covering 40 that includes body part 41 that covers an outer periphery of insulating tube 20, and a plurality of umbrella-shaped sheds 42 that are formed with a space therebetween in a longitudinal direction at an outer periphery of body part 41; and electric-field stress-control layer 50 that is composed of a zinc oxide layer or a high-permittivity layer, and is disposed along an interface between insulating tube 20 and the polymer covering 40. A rear end part of electric-field stress-control layer 50 is connected to shielding metal fitting 30. Body part 41 of polymer covering 40 includes thin part 411 (first body part) that has a uniform thickness, and thick part 413 (second body part) that is located in a region around a front end part of electric-field stress-control layer 50 and has a thickness greater than the thickness of thin part 411.

The thickness of body part 41 of polymer covering 40 at at least a portion located at front end part 50a of electric-field stress-control layer 50 where the electric field tends to be concentrated is greater than that of other portions, and thus polymer bushing 2 can reduce the electric field of the air surface of the polymer bushing 2 (shed surface) in a region around front end part 50a of electric-field stress-control layer 50. Accordingly, the corona resistance is improved, and a high voltage such as the rated voltage 154 kV can be handled. In addition, the shape of front end part 50a of electric-field stress-control layer 50 is simple in comparison with the polymer bushing disclosed in PTL 1, and therefore electric-field stress-control layer 50 can be readily formed.

In addition, in polymer bushing 2, body part 41 is expanded radially inward to form thick part 413, and therefore leakage distance is not shortened by providing thick part 413.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, as a combination of the first embodiment and the second embodiment, a part of body part 41 may be expanded radially inward and outward to form thick part. While the length of thick parts 412 and 413 in the longitudinal direction is not limited as long as the corona characteristics are improved, the length of thick parts 412 and 413 in the longitudinal direction is preferably as short as possible in view of saving the material cost of polymer covering 40.

While the polymer bushing is applied as a bushing for an equipment in the embodiments of the present invention, the polymer bushing of the embodiments of the present invention may be applied as a wall penetrating bushing (see PTL 3), and as a cable sealing end (see PTL 4 and FIG. 5) including a connecting part (such as a stress-relief cone and a compression unit) of the cable termination on the rear end side of insulating tube 20.

Figure 5:
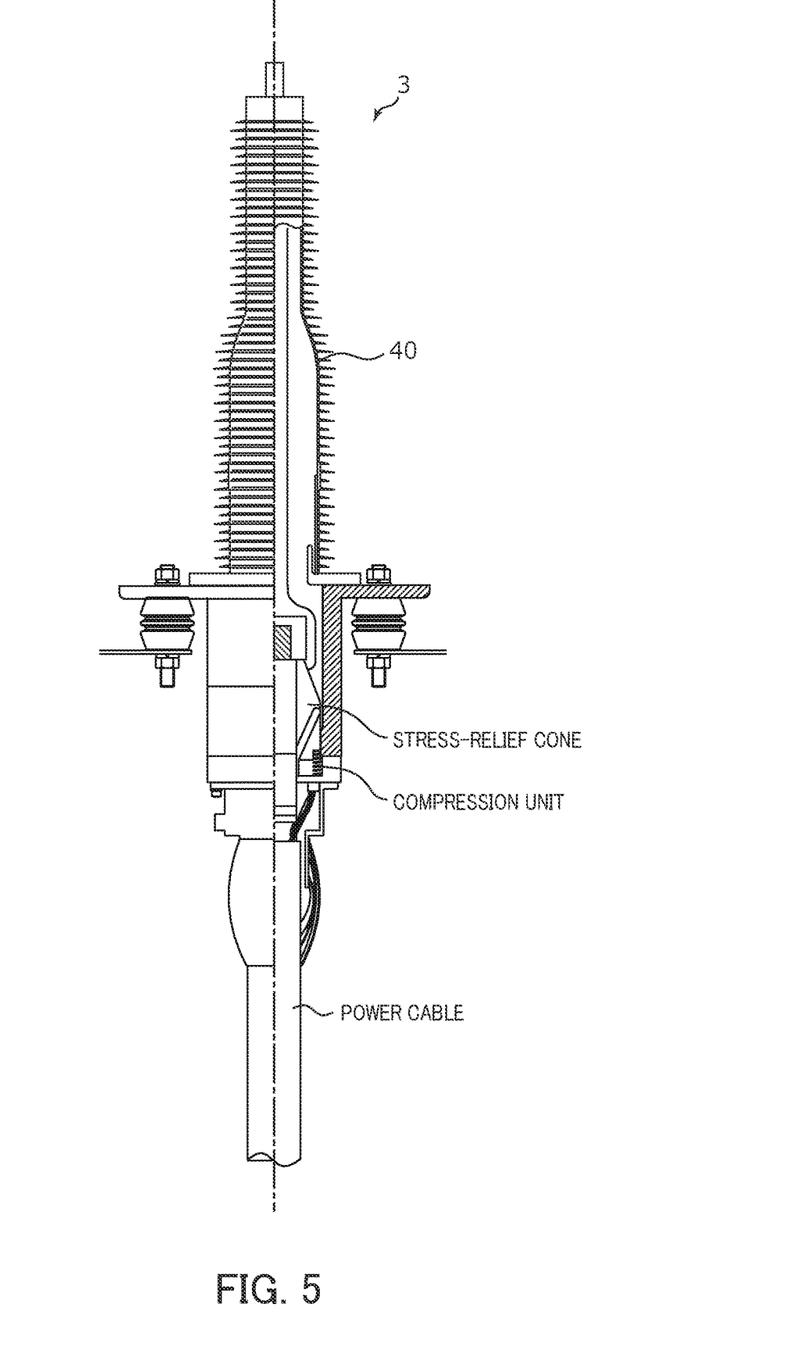
FIG. 5 is a partial sectional view illustrating a general configuration of a polymer bushing according to a modification.

FIG. 5 is a partial sectional view illustrating a general configuration of polymer bushing 3 in which the present invention is applied to a cable sealing end (indoor/outdoor termination). The structure (the portion including polymer covering 40) on the air side of polymer bushing 3 of FIG. 5 is identical to the structure (the portion including polymer covering 40) on the air side of polymer bushing 1 of the first embodiment or polymer bushing 2 of the second embodiment, and therefore the specific description thereof is omitted.

While cable sealing ends are categorized into so-called inner cone type in which a stress-relief cone is housed in insulating tube 20, and so-called outer cone type in which a rubber block covers the outer periphery of the insulator such that the polymer bushing and the cable termination are connected to each other as with the RBJ (rubber block joint) insulation type, the present invention is applicable to both types.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

This application is entitled to and claims the benefit of Japanese Patent Application No. 2015-014363 dated Jan. 28, 2015, the disclosure of which including the specification, drawings and abstract is incorporated herein by reference in its entirety.

REFERENCE SIGNS LIST 1, 2 Polymer bushing
10 Inner conductor
20 Insulating tube
21 Small diameter part
22 Tapered part
23 Large diameter part
30 Shielding metal fitting
31 Cylinder part
32 Flange part
40 Polymer covering
41 Body part
42 Shed
411 Thin part
412, 413 Thick part
50 Electric-field stress-control layer
H Head part
C Case

What is claimed is:

1. A polymer bushing comprising:
an inner conductor that is disposed at a center and has a rod shape;
a hard insulating tube that is integrally formed at an outer periphery of the inner conductor;
a shielding metal fitting that is embedded to the insulating tube such that the shielding metal fitting is concentric with the inner conductor;
a polymer covering that includes a body part that covers an outer periphery of the insulating tube, and a plurality of umbrella-shaped sheds that are formed with a space therebetween in a longitudinal direction at an outer periphery of the body part; and
an electric-field stress-control layer that is composed of a zinc oxide layer or a high-permittivity layer whose relative permittivity is greater than or equal to 10, and is disposed along an interface between the insulating tube and the polymer covering, wherein a rear end part of the electric-field stress-control layer is connected to the shielding metal fitting, wherein:

the body part includes:

first body parts that each have a uniform thickness, the first body parts being disposed respectively in regions on a front end side and a rear end side of the polymer bushing relative to a front end part of the electric-field stress-control layer, and a second body part that is disposed in a region from a rear end part of the first body part on the front end side of the polymer bushing to a front end part of the first body part on the rear end side of the polymer bushing to include at least a position of an outer periphery of the front end part of the electric-field stress-control layer, the second body part having a thickness greater than the thickness of each of the first body parts, an outer diameter of the shed provided at an outer periphery of the second body part is identical to an outer diameter of the shed provided at an outer periphery of the first body part adjacent to the second body part.

2. The polymer bushing according to claim 1, wherein an outer diameter of the second body part is greater than an outer diameter of the first body part adjacent to the second body part.

3. The polymer bushing according to claim 2, wherein an inner diameter of the second body part is identical to an inner diameter of the first body part adjacent to the second body part.

4. The polymer bushing according to claim 1, wherein an inner diameter of the second body part is smaller than an inner diameter of the first body part adjacent to the second body part.

5. The polymer bushing according to claim 4, wherein an outer diameter of the second body part is identical to an outer diameter of the first body part adjacent to the second body part.

6. The polymer bushing according to claim 4, wherein the second body part includes a slope part whose thickness gradually decreases toward the first body part adjacent to the second body part on a rear end side.

7. The polymer bushing according to claim 1, wherein:

the insulating tube includes a small diameter part that is formed in a straight barrel shape, a tapered part whose diameter gradually increases toward a rear end side from the small diameter part, and a large diameter part that is formed in a straight barrel shape on a rear end side of the tapered part; and the front end part of the electric-field stress-control layer is located at the large diameter part.

\* \* \* \* \*